United States Patent Office 3,509,343
Patented Apr. 28, 1970

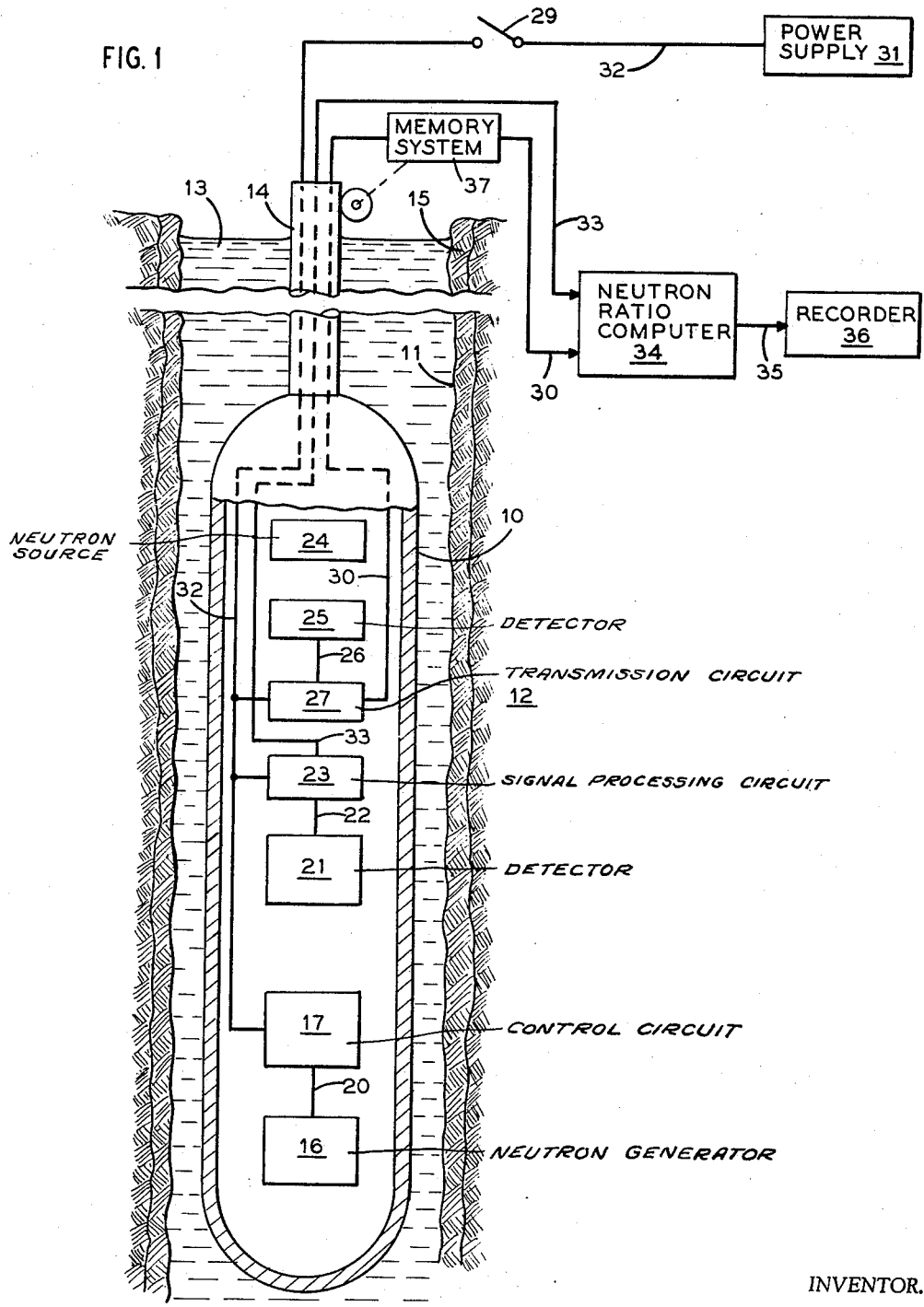

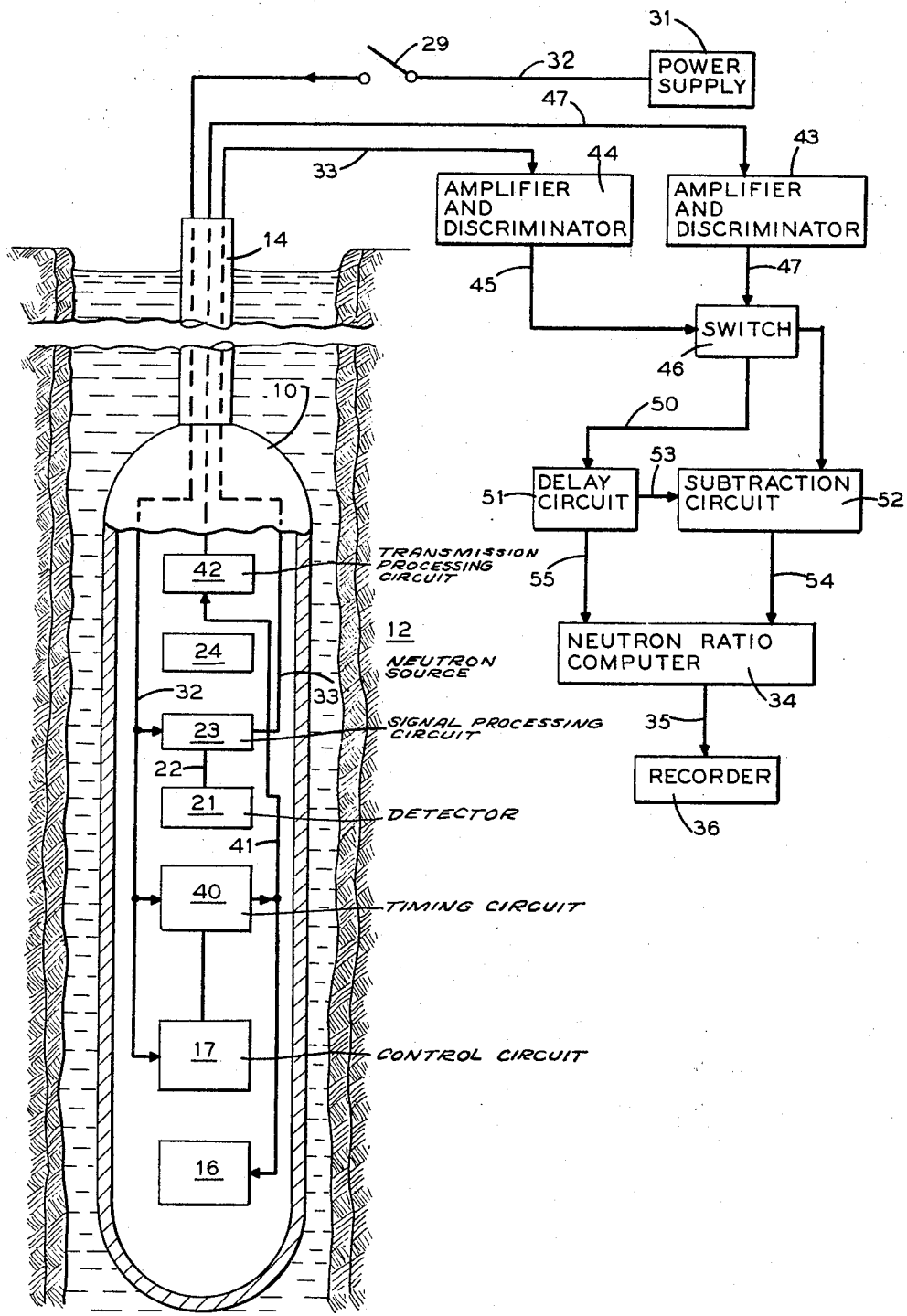

3,509,343
MEASURING APPARATUS AND METHOD
Stanley Locke, Norwalk, Conn., assignor to Schlumberger Technology Corporation, New York, N.Y., a corporation of Texas
Filed Aug. 21, 1967, Ser. No. 662,111
Int. Cl. G01t 3/00
U.S. Cl. 250—83.1         1 Claim

ABSTRACT OF THE DISCLOSURE

In accordance with an illustrative embodiment of the invention, a 14 mev. neutron source and a 5 mev. neutron source are mounted within a borehole logging tool, The neutron population characterizing the earth formation generated by the 14 mev. source is contrasted with the neutron population generated by the 5 mev. source by computing a ratio of the detected neutron activity originating in the higher energy range to the neutron activity produced by the low energy source. The ratio indicates the mineral composition of the earth formation surrounding the borehole. Thus, sandstone is characterized by a lower ratio than either a dolomite or a limestone formation, the silicon in the sandstone absorbing relatively more high energy neutrons.

BACKGROUND OF THE INVENTION

Field of the invention

This invention relates to borehole logging methods and apparatus and, more particularly, to a neutron technique for identifying the mineral structure of an earth formation, and the like.

Description of the prior art

Sandstone is perhaps one of the most common of all of the oil-bearing earth formations. Consequently, the positive identification of sandstone in the earth formations adjacent to a borehole is important in the identification of oil or gas production horizons.

Because silicon is a major constituent of sandstone, proposals have been advanced to identify this element through neutron irradiation techniques. A typical proposal is described in U.S. Patent No. 2,996,618, issued Aug. 15, 1961, to Clark Goodman and John T. Dewan, for "Well Logging Methods and Apparatus," and assigned to the same assignee as the invention described herein.

This proposal suggests irradiating an earth formation with two groups of neutrons, each group having a discrete energy, in order to more clearly identify the presence of silicon within the adjacent earth formation. The proposed detection technique for observing these irradiations, however, relies on the observation of neutron activated gamma rays emitted by silicon nuclei in the earth formation. Some of the gamma radiation is emitted as a consequence of the disintegration of the silicon nuclei at a characteristic rate. Necessarily, then, the time required to log a borehole must be balanced between the time required to establish a sufficient accumulation of detected gamma radiation to permit a statistically valid interpretation of the formation and the commercial demand to log a borehole in the shortest possible time in order to reduce the interruption in well production to a minimum. Accordingly, the aforementioned gamma ray detection technique is not entirely satisfactory for "matrix" or mineral composition logging purposes.

Thus, it is an object of the invention to provide an improved method for identifying the presence of silicon in an earth formation.

It is another object of the invention to indicate sandstone formations through the relative size of the neutron population generated in the formation by different energy sources.

It is still a further object of the invention to provide an improved matrix logging tool.

It is another object of the invention to provide an improved logging technique in accordance with the neutron energy dependency of the formation characteristics.

SUMMARY

In accordance with the invention, a borehole logging tool has a source of 14 mev. neutrons and a source of 5 mev. neutrons that simultaneously irradiate an earth formation. The 14 mev. neutrons are produced by means of a generator tube that can be turned on and off. Consequently, a single detector within the tool observes the neutron population size first with the 14 mev. source off and then with it on, thereby obtaining two readings with one detector. In one embodiment of the invention, a computation circuit subtracts the detector count when the 14 mev. neutron source is deactivated from the detector count registered when the 14 mev. source is energized. This subtraction compensates the detector response established by the high energy neutrons for the effect of the neutrons of low energy origin. A ratio is struck between the detector responses produced by the neutrons scattered back by the formation to the tool to indicate the presence of silicon in the earth formation.

Ratios from prior tool calibration in formations of known mineral composition are compared with the ratio characterizing the formation under investigation, a relatively low ratio being indicative of a sandstone formation.

Thus, by direct observation of the neutron population, the delay inherent in the gamma ray measurements that has typified the prior art is substantially reduced. Accordingly, greater logging speeds with acceptable statistical accuracy now are available through the practice of this invention.

More particularly, helium 3 ($He^3$) semiconductor detectors of the type described in more complete detail in "Recent Improvements in Helium-3 Solid State Neutron Spectrometry," by Thomas R. Jeter and Max C. Kennison, IEEE Transactions on Nuclear Science, February 1967, vol. NS-14, No. 1, pages 422–427, are particularly adapted to the neutron energy sensitivity requirements of the invention.

As an alternative embodiment of the invention, a specific neutron detector can be associated with each neutron source. In this manner, a continuous detector signal ratio is provided, inasmuch as the the neutron source is operated during the entire logging run and both detectors produce an uninterrupted output signal.

For a better understanding of the present invention, together with other and further objects thereof, reference is had to the following description taken in connection with the accompanying drawing, the scope of the invention being pointed out in the appended claims.

BRIEF DESCRIPTION OF THE DRAWING

FIG. 1 shows a schematic diagram in partial section of one embodiment of the invention, in which the electrical circuits associated therewith are illustrated in block diagram form; and FIG. 2 shows an alternative embodiment of the invention.

DESCRIPTION OF THE PREFERRED EMBODIMENTS

An illustrative embodiment of a practical apparatus for indicating formation mineral composition in accordance with princples of the invention is shown in FIG. 1.

The apparatus comprises a fluid-tight pressure resistant housing 10 adapted to pass through a borehole 11 that traverses an earth formation 12. The borehole 11 may be filled with a water-base or oil-base drilling mud 13, as shown. Housing 10 is suspended in the borehole 11 by an armored cable 14 which may contain a group of insulated conductors for transmitting signals to the earth's surface. A winch (not shown) located at the surface of the earth is used to lower and raise the housing in the borehole in the customary manner to traverse the earth formation 12. The bore hole 11 is lined with a mudcake 15 that usually is deposited as a residue on the wall of the borehole 11 when filtrate from the mud 13 seeps into the formation 12.

The lowermost portion of the housing 10 contains a neutron generator 16 of the type more completely described in U.S. patent application Ser. No. 627,404 filed Mar. 31, 1967, by Arthur H. Frentrop for "Neutron Generating Systems," and assigned to the same assignee as the invention described herein.

The neutron generator is controlled by an associated circuit 17 through a conductor 20. The neutron generator, which produces 14.1 mev. neutrons in response to deuterium-tritium interactions, irradiates the surrounding earth formation 12 with these high energy neutrons.

A neutron detector 21 within the housing 10 responds to the neutrons that are scattered back to the housing through collisions with nuclei in the formation 12. Typically, the neutron detector 21 can be an $He^3$ semiconductor detector of the type more completely described in the aforementioned Thomas R. Jeter et al. article. Appropriate neutron shielding (not shown) can be placed within the housing 10 between the detector 21 and the neutron generator 16 to attenuate direct neutron radiation. The sensitivity of the aforementioned $He^3$ semiconductor device for neutron detection, moreover, is especially useful in the present invention because it responds through a broad spectrum of neutron energies. Other neutron detectors, however, such as boron trifluoride tubes, also can be used to practice the invention.

A signal from the neutron detector 21 is applied to a conductor 22 for transmission to a downhole signal processing circuit 23. The circuit 23 conveniently may comprise amplifiers, pulse height discriminators and scaling circuits that prepare the signal output from the detector 21 for transmission to the earth's surface through a conductor 33 in the armored cable 14.

Spaced vertically above the downhole signal circuit 23 is a neutron source 24. The source 24 emits neutrons that have an average energy of 5 mev. or less. Typically, a plutonium-beryllium or an americium-beryllium "chemical" neutron source is satisfactory for this purpose. Neutrons from the source 24 also irradiate the formation 12. Some of these lower energy neutrons emitted by the source 24 that are scattered back from the formation 12 are registered by a neutron detector 25.

The detector 21 and the associated circuit 23 establish a signal that characterizes those neutrons reflected back from the formation 12 that originated at energies greater than about 5 mev. For example, the detector 21 can be spaced a sufficient distance from the source 24 of 5 mev. neutrons to reduce the signal contribution from this source to a negligible amount. Shielding also may be placed within the housing 10 between the detector 21 and the neutron source 24. If desired, the neutron signal from the detector 21 attributable to the source 24 can be measured during times when the 14.1 mev. neutron generator 16 is quiescent. The neutron activity detected during these intervals is subtracted from the activity detected during operation of the generator 16 to compensate for the influence of the neutron source 24. In a like manner, the detector 25 can be isolated from the influence of the 14.1 mev. neutrons emitted by the generator 16. Accordingly, the downhole signal circuit 23 transmits signals characterizing those detected neutrons that originated at energies greater than 5 mev.

The neutron detector 25, which conveniently may be of the same type as that described in connection with detector 21 and appropriately shielded (not shown) from direct radiation from the neutron source 24, responds to these back-scattered neutrons by sending a signal through a conductor 26 to another downhole transmission circuit 27. The transmission circuit 27 is similar to the circuit 23 in order to transmit signals from the detector 25 to the earth's surface through a conductor 30 in the armored cable 14. Noise and other undesirable signals, moreover, that are not representative of the back-scattered 5 mev. neutron population also can be discriminated out by an appropriate pulse height discriminator in the circuit 27.

Consequently, the transmission circuits 23 and 27 establish two transmission channels for the detector signals, the channel through the conductor 33 characterizing the neutron population originating from a source energy above 5 mev. and the channel through the conductor 30 representative of the neutron population originating from a source energy below 5 mev.

Power for the downhole electrical equipment is provided by a power supply 31 on the earth's surface through a switch 29 and a conductor 32 in the armored cable 14.

Because the overall separation between the detectors 21 and 25 can be more than 30", the detectors necessarily are not measuring the same portion of the earth formation 12 at the same time. Thus, without appropriate compensation, the signals from the detectors cannot be compared directly.

This discrepancy is overcome, when recording data as the housing 10 is drawn upwardly through the borehole 11, by providing a memory system 37 in the surface apparatus. The memory system stores the signal from the detector 25 transmitted through the conductor 30 for the time required to draw the detector 21 up the borehole 11 a distance equal to the separation between the detectors 21 and 25. The memory system 37 can be paced by a measuring wheel and linkage associated with the armored cable 14 to adjust the signal storage time to match changes in the upward movement of the housing 10 through the borehole 11. In this manner, the detector signals applied to a neutron ratio computer 34 are manipulated to correspond to the same position in the formation 12 in spite of the separation between the detectors 21 and 25.

The ratio computer 34 strikes a ratio between the two neutron populations. A ratio computer of this sort is described in more complete detail in U.S. patent application Ser. No. 570,068 filed Aug. 3, 1966, by Stanley Locke, Harold Sherman and John S. Wahl for "Measuring Apparatus and method," and assigned to the same assignee as the invention described herein.

An output signal from the computer 34 is applied by a conductor 35 to a recorder 36. The recorder 36 produces a graph of the neutron population ratio as a function of borehole depth. This ratio can be compared with standard ratios derived from measurements made with tools such as that shown in FIG. 1 with limestone, sandstone and other laboratory test formations of known characteristics, such as porosity, density and exact chemical compositions, in order to provide a comparison basis for identifying the presence of silicon or sandstone in the formation 12.

Because silicon has a high neutron absorption cross-section for neutrons in the energy range between 5 mev. to 14 mev., the ratio of neutrons originating at high energies to those originating at lower energies detected by the logging tool will necessarily be lowest in traversing a non-porous (or "tight") formation of pure sandstone. Thus, one important oil-bearing formation can be identified affirmatively thruogh an examination of the neutron characteristics in the fast and intermediate energy ranges.

Neutrons in this range, moreover, are not especially sensitive to variations in borehole conditions, such as the presence of drilling mud, and changes in borehole diameter and the like. Consequently, the computed ratios are largely independent of these influences.

As shown in FIG. 2, signals characterizing both the 5 mev. and 14.1 mev. neutron populations can be provided with one neutron detector. Thuse, the 14.1 mev. neutron generator 16 is energized intermittently by a timing circuit 40. The energizing timing signals from the circuit 40 are sent through a conductor 41 to the generator 16 and to the earth's surface. The timing signals reach the earth's surface by way of a transmission processing circuit 42 in the housing 10 which is coupled to a conductor 47 in the cable 14.

The timing signals are amplified on the earth's surface and noise or other undesirable signals are discriminated out by a circuit 43. The signal from the detector 21, however, is sent to the earth's surface through the conductor 33 which is coupled to the downhole signal circuit 23 in the housing 10. By properly positioning the detector 21 relative to the neutron sources 16 and 24, the signal from the detector characterizes the neutron population in the formation 12 established by the 5 mev. neutrons from the source 24 when the neutron generator 16 is de-energized. The timing signals from the circuit 40, however, intermittently activate the generator 16 and cause the signal from the detector 21 to reflect the neutron population established by the 5 mev. and 14.1 mev. sources.

The detector signal in the conductor 33 is amplified and the noise is filtered out by a circuit 44 at the earth's surface. The output from the circuit 44 is coupled through a conductor 45 to a switch 46. The switch 46 responds to the amplified timing signals in a conductor 47 from the circuit 43 by selectively gating the 5 mev. neutron-originated signal through a conductor 50 to a delay circuit 51. The switch 46 gates the combined 5 mev. and 14.1 mev. neutron-originated signal to a subtraction circuit 52. The 5 mev. neutron-originated signal is coupled through a conductor 53 from the delay circuit 51 to the subtraction circuit 52 to enable the circuit 52 to subtract the preceding 5 mev. neutron-originated signal from the next succeeding combined 5 mev. and 14.1 mev. neutron-originated signal. The subtraction circuit 52 establishes a difference signal in a subtraction circuit output conductor 54 that corresponds substantially only to the neutron population produced by the 14.1 mev. neutrons emitted from the generator 16.

The signal in the conductor 54 and the immediately preceding 5 mev. neutron-originated signal from the delay circuit 51 in a conductor 55 are connected to the neutron ratio computer 34 hereinbefore described. A signal corresponding to the ratio calculated in the computer 34 is coupled to the recorder 36 through the conductor 35. The recorder signal is intermittent rather than continuous by force of the pulse operation of the neutron generator 16 and the combined character of the signal in the conductor 33.

A further embodiment of the invention eliminates the subtraction circuit 52 and strikes a ratio directly between the combined 5 mev. and 14.1 mev. neutron-originated signal, and a delayed 5 mev. neutron-originated signal that immediately precedes the combined signal.

The housing 10, moreover, can be centered within the borehole 11, or biased against the earth formation 12 by means of appropriately arranged bowsprings, or the like, as indicated by environmental conditions. The neutron sources 16 and 24 need not be combined in the same housing 10, but can be used individually in separate logging runs. The signals provided by the individual runs can be stored on tape, punched cards and the like in order to provide a basis for the aforementioned ratio calculation at the end of the last logging run. Nor is the invention limited to the identification of siliceous formations, but is applicable to any other earth formation characteristic that can be distinguished through the differences in neutron populations, wherein the neutrons comprising these populations have different initial energies.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A borehole logging tool comprising a housing, a source of neutrons within the housing for irradiating the earth formations surrounding the borehole with neutrons of a first energy, another neutron source within the housing for irradiating the formation therearound with neutrons of a different average energy than those emitted by the other source, circuit means for selectively energizing at least one of said neutron sources, a neutron detector within the housing functionally responsive to neutrons emitted from both of said sources and scattered back by by the earth formation when said neutron source is selectively energized, and circuit means coupled to said detector for indicating the relative absorption within the formation of the different average energy neutrons emitted by said source.

References Cited

UNITED STATES PATENTS

| 2,760,078 | 8/1956 | Youmans | 250—83.3 |
| 2,971,094 | 2/1961 | Tittle | 250—83.1 |
| 2,996,618 | 8/1961 | Goodman | 250—83.6 |

OTHER REFERENCES

Semiconductor Fast Neutron Detectors, Dearnaley et al., I.R.E. Transactions on Nuclear Science, vol. NS-9, No. 3, June 1962, pp. 174–180.

RALPH G. NILSON, Primary Examiner

D. L. WILLIS, Assistant Examiner

U.S. Cl. X.R.

250—83.3